June 23, 1936.  V. A. BARY  2,044,931
AXLE BEARING
Filed Aug. 8, 1932   2 Sheets-Sheet 1

Inventor:
V. A. Bary

June 23, 1936.  V. A. BARY  2,044,931
AXLE BEARING
Filed Aug. 8, 1932  2 Sheets-Sheet 2

Inventor:
V. A. Bary

By: Marks & Clerk
Attys.

Patented June 23, 1936

2,044,931

UNITED STATES PATENT OFFICE 2,044,931

AXLE BEARING

Victor Alexander Bary, Hendon, London, England

Application August 8, 1932, Serial No. 627,901
In Germany August 12, 1931

4 Claims. (Cl. 308—40)

Axle bearings with fully annular axle brasses, which are carried in a hollow cylindrical aperture in the axle box have hitherto been secured with the axle box by a screw which penetrated the axle box and entered into a hole in the fully annular brass. This arrangement is unreliable and disadvantageous because, as is well-known, a screw does not form a tight joint. Therefore oil escapes particularly from axle bearings with circulating and cooling lubrication, although the maintenance of this amount of lubricant is absolutely necessary in order to ensure that the supply member dips to a certain depth into the lubricant well. The present invention sets the problem of constituting the securing means of the fully annular brass without breaking through the axle box in any way. The problem is solved according to the invention, by arranging, on both sides on the undivided fully annular brass or on the undivided shell which holds the divided fully annular brass together, stops which abut against the end faces of the hollow cylindrical part of the axle box and connect the fully annular brass with the axle box. Preferably the stops are formed as threaded rings.

The drawings show constructional forms of the inventive idea by way of example.

Figure 1:
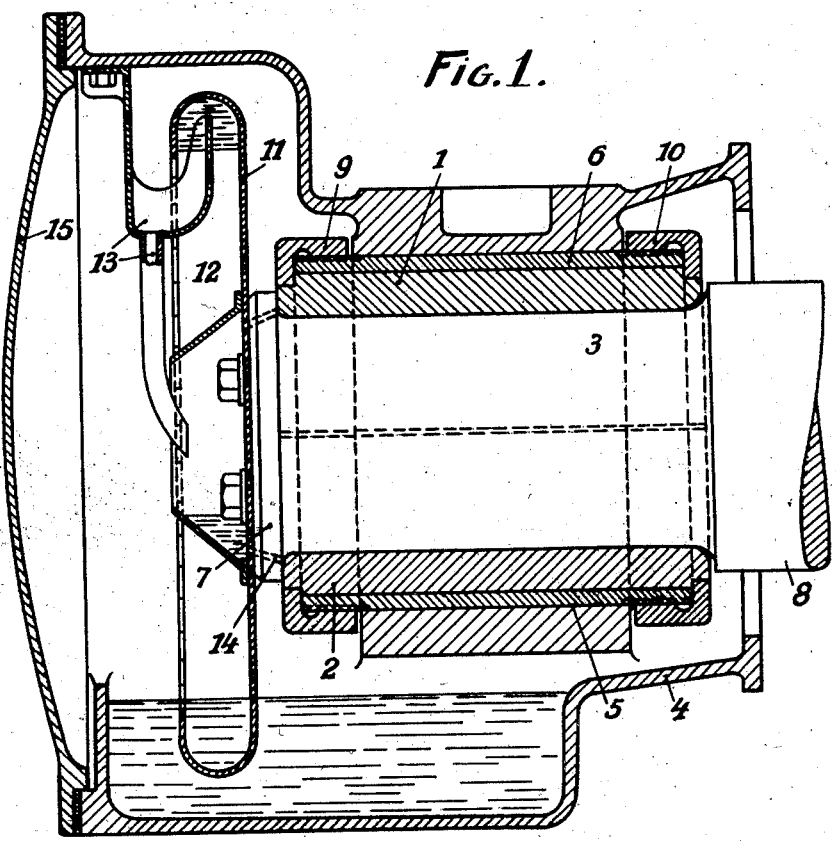
Figure 2:
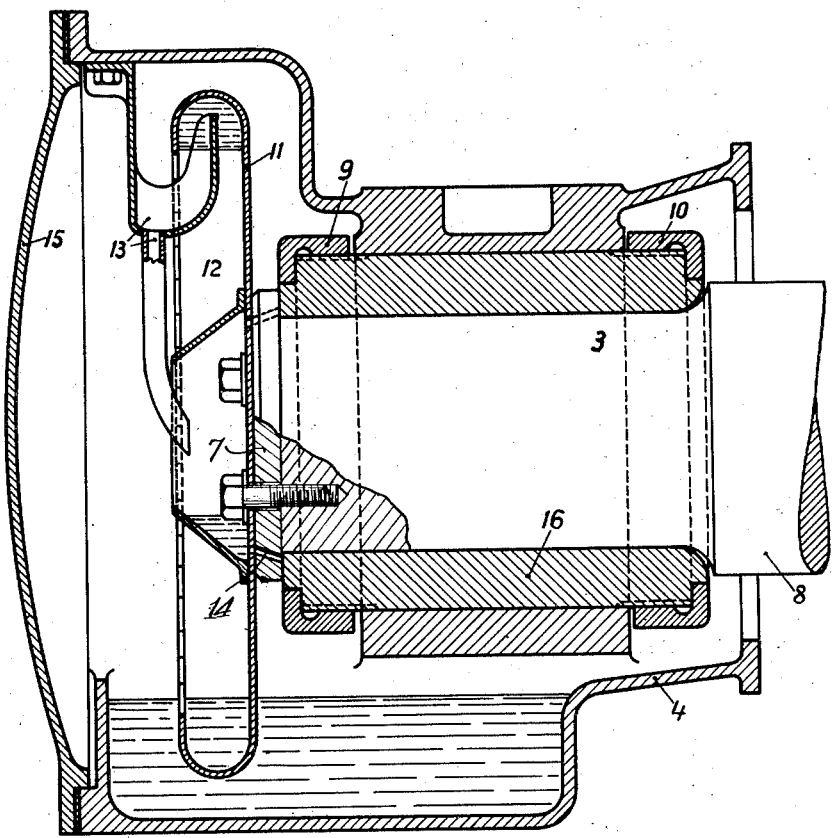

Figure 1 is a longitudinal section through an axle bearing, according to the invention, with a two-part fully annular brass and sleeve holding both parts together while Figure 2 shows in the same longitudinal section an axle bearing having a single undivided fully annular brass.

I indicates the upper, 2 the lower half of the fully annular brass which surrounds the journal 3 and, according to the problem of the present invention, is to be fixed to the axle box 4 or its hollow cylindrical aperture 5 so that the fixing means necessitate no breaking through the axle box. To this end there are arranged on the one-piece steel shell 6, which holds together the two halves I and 2 of the brass, both towards the collar 7 of the journal as well as towards the enlarged part 8, threaded rings 9 and 10 which in the fixed position abut with their front faces against the brasses I and 2 and against the front faces of the aperture 5, and in this way prevent axial displacement of the fully annular brass relatively to the axle box. Rotation of the axle brass relatively to the axle box is prevented in the usual manner by tangential keys or by other equivalent means.

The assembly and disassembly of the new fastening device takes place as follows:—

First the two halves of the brass, with the axle box removed, are fitted on the journal and held in position by the steel sleeve 6. The screw ring 10 had already been previously inserted on the enlarged part 8. After fitting the brasses and the sleeve 6 the screw ring 10 is screwed on the steel sleeve 6 and secured. After this the axle box is fitted on the journal by introducing the sleeve 6 into the hollow space 5 of the axle box 4. As soon as the axle box is fitted, the screw ring 9 is screwed on and secured. After this the devices 11 and 12 are connected to the journal collar 7 and the device 13 to the axle box 4, so that the lubrication of the axle bearing is ensured by way of the lubricating grooves 14. Finally the cover 15 is screwed on. The procedure takes place obviously in reverse manner on disassembling the axle brasses.

Figure 2 shows in longitudinal section an axle bearing with a single, undivided fully annular brass 16 which is secured against displacements by threaded rings 9 and 10 arranged at the side of the collar and enlarged part. In order to be able to place the bearing brass on the axle journal, the axle journal collar 7 is detachably mounted. Moreover, the construction of the axle bearing according to Figure 2 corresponds exactly to the construction af the axle bearing according to Figure 1 so that the reference numerals are the same. The insertion and removal of the bearing brass are also effected accordingly.

I claim:—

1. An axle bearing comprising in combination a one-piece axle box housing having a hollow cylindrical aperture, an axle journal including a collar and an enlarged part, a multi-part axle box arranged between the collar and the enlarged part, a one-piece annular cylindrical sleeve on the said multi-part axle box for holding the parts of the axle box together, the said axle box and the said sleeve being carried in the hollow cylindrical aperture of the housing, annular stops on said sleeve which are arranged at the side of the collar and the enlarged part and bear against the end faces of the housing part which forms the hollow cylindrical aperture.

2. An axle bearing comprising in combination a one-piece axle box housing having a hollow cylindrical aperture, an axle journal collar and an enlarged part, an annular closed axle box which is cylindrical on its outside and arranged on the axle journal between collar and enlarged part, the said axle box being carried in the hollow cylindrical aperture of the housing, annular insertable and removable stops arranged at the side of the collar and enlarged part on the said axle box, the said annular stops bearing against the cylindrical end faces of the housing part which forms the hollow cylindrical aperture.

3. An axle bearing according to claim 2, the said stops being designed as a closed threaded ring and adapted to be screwed on the annular box, the said threaded ring having an inwardly projecting annular flange and the said flange bearing firmly against the end faces of the annular box in the end position.

4. An axle bearing according to claim 1, the said stops being designed as closed threaded rings and adapted to be screwed on the one-piece annular cylindrical sleeve holding the parts of the axle box together, the said threaded ring having an inwardly projecting annular flange, the said flange bearing firmly against the end faces of the sleeve and the divided axle box in the end position.

VICTOR ALEXANDER BARY.